3,100,710
MEAT PRODUCT AND METHOD FOR PRODUCING SAID PRODUCT
George T. Carlin, Chicago, Ill., assignor to Swift & Company, Chicago, Ill., a corporation of Illinois
No Drawing. Filed Sept. 8, 1958, Ser. No. 759,419
9 Claims. (Cl. 99—107)

The present invention relates in general to the preparation of a meat product. More particularly the invention concerns the piecing together of variably-shaped portions of meat through the use of a particularly suitable binder.

Flour has been used in the past as an aid in the preparation of a more readily moldable comminuted meat that will hold its shape to some degree during cooking. An example of this treatment would be its use by a housewife in the preparation of a meat loaf or croquette. However, wheat flour per se does not have sufficiently strong adhesive powers to bind large pieces of meat during cooking. It will bind the chunks of meat, for example, boned ham pieces, together prior to cooking of the meat, but the seams formed by the use of flour will be weak and the meat will fall apart after cooking and/or during slicing. Another objectionable feature of flour as a binder is its color. The appearance of meat is an important factor in the salability thereof. The flour produces a white, doughy appearing seam which is altogether undesirable when slicing a roast or other meat product composed of chunks of meat pieced together.

Gelatin is commonly used in the meat industry as a binder for ham rolls, table-ready meats, etc. Gelatin is a pure protein and possesses binding powers when cold. However, upon the application of heat the gelatin melts, losing its adhesive properties. A meat product prepared by binding together chunks thereof with gelatin will fall apart when sliced while hot. Other products have been used as binders such as starch, soybean flour, etc. Each of these possesses some property which is undesirable in the production of an improved meat product. Either the adhesion is not sufficient to keep the meat from falling apart during slicing, before or after cooking, or the product produced is unattractive, etc.

It is therefore an object of this invention to provide an improved meat product formed of chunks of meat secured together with a binding agent that gives good adhesion between the chunks of meat, both raw and cooked.

Another object of the invention is to produce a meat product wherein any seam present therein is barely discernible in the meat, thereby forming an attractive product.

A still further object is to provide a method for the efficient binding of pieces of meat such that the meat will not fall apart during slicing.

Still another object is to provide a method for the production of connective tissue-like seams in a meat product prepared by piecing together variably-shaped portions of meat.

Further objects and advantages will become apparent to one skilled in the art from the following description of my invention.

I have discovered that wheat gluten has amazing powers of adhesion to meat. Wheat gluten is the protein component of wheat flour and is prepared by separating flour (which contains anywhere from about 8 to 15% protein) into its components, wheat starch and wheat gluten, by the fractionation process. Gluten sold under the designation P–80 is eminently suitable for our purposes. This product is 80% protein. However, for the purposes of this invention, wheat gluten is defined as containing at least about 30% protein. The optimum results are achieved when using gluten containing at least about 80% protein. This exceptional binding power is unique to the wheat protein; no other vegetable or grain proteins, for example, oats, corn, rye, barley, soybean, etc., possesses the rubbery, binding property of wheat gluten. Gluten is also distinguished from other protein binders such as soybean flour and the like in that it is coagulable during the cooking procedure.

In addition to the meat-binding property of gluten, I have found that the color of cooked gluten is darker than that of flour and is productive of a membraneous or tissue-like connective substance which simulates the connective tissue of meat. When used to bind pieces of pork, for example, the seams are hardly discernible inasmuch as the color is so similar to that of the cooked pork itself.

My process is applicable to all meat items where tissue separation is a problem. The gluten can be added to fresh, frozen, or cured meat with no change in effectiveness of adhesion. By the term "meat" I mean to include the meat of fowl and fish as well as that of mammals.

Any method for incorporating the gluten into or depositing it on the meat is suitable in the practice of my invention. Preferably I sprinkle or dust the gluten onto the cut surface of the meat. The meat is then rolled, molded, or otherwise formed into whatever shape is desired and further processed in any conventional manner. After this treatment the casings, molds, etc., may be removed and the meat will hold the shape to which it was conformed. The meat will not fall apart when sliced, hot or cold.

An alternative method of adding the gluten is by means of a slurry made by mixing gluten with water or with water and oil. This slurry can be applied to the meat surface as desired. This is a particularly effective way of adding gluten when treating frozen pieces of meat.

Another method of adding gluten is to prepare a watered gel of agar-agar, gelatin, and water. This type of gel may be prepared by cooking a 2% solution of agar-agar in water to which is added an additional 2% gelatin. The gel is then allowed to cool and then approximately 10% gluten is added thereto. The gel can be applied directly to the meat tissue by a roller, with a brush, or by hand. This method is particularly suitable when it is desirable to inject the binding material into a meat cavity or meat seam which ordinarily is inaccessible to application of dry gluten.

I have found that a very suitable method for adding the gluten to extremely lean meat, for example, veal, is the application of a mixture composed of equal parts of lard, butter, or shortening and dry gluten. The resultant mixture is a paste-like mass which can be spread on the surface of the meat. The meat can then be shaped and cooked. The presence of fat in this mixture does not interfere with the binding properties of gluten.

The amount of gluten added to the meat is not critical and is readily ascertainable by experimentation. The optimum amount will vary with the type of meat being treated, the size of the pieces thereof, the amount of added moisture and fat, etc. I have found that anywhere from about 0.2 to 5.0% gluten by weight of the meat is suitable for most meat products to be treated, for example, comminuted meat products such as sausages and meat balls and other meat products such as ham rolls, turkey rolls, liver, steaks, pork rolls, etc.

The following are examples of the use of gluten as a binder in meat products. They are set out for purposes of illustration only and are not to be construed as limiting the scope of the appended claims.

EXAMPLE I

Pork ham was cured in the conventional manner. The ham was opened and all bones removed. The cut surface of the ham was then sprinkled with dry wheat gluten to the extent of approximately 1½ to 2½ ounces wheat gluten per 10 pounds of ham. The ham was then rolled and tied together (alternatively it could be placed in a casing). It was then smoked and cooked by conventional procedures. Upon removal of the strings (or the casing) the ham product held its shape and did not fall apart during slicing either when hot or cold.

EXAMPLE II

Ham was processed as in Example I. A mixture of gluten, gelatin, and pink vegetable dye was added. The ham was then further processed as described in Example I. Again there was no falling apart of the meat during slicing, and the seams composed of the coagulated gluten were barely discernible in the product.

A ham handled in precisely the same manner but containing gelatin only and no gluten did not possess the same binding powers and the product fell apart when sliced while hot.

EXAMPLE III

Sliced pieces of turkey, both light and dark, were dusted with gluten while raw. These pieces of turkey were then placed in metal forms (or in casings). Upon cooking, the pieces of turkey were bound together and, upon removal of the form, produced a firm loaf which was sliced hot and cold without the individual pieces of turkey meat falling apart.

EXAMPLE IV

Pork trimmings one inch in diameter were dusted with gluten and pressed together in a form. The formed meat was then frozen and sliced while frozen to produce a slice thickness normal to that of a pork chop. At this point there was no breaking apart of the pieces of pork. The resulting product was then cooked both by frying and broiling to produce final pieces of meat of almost identical texture to that of pork chops. The seams composed of the coagulable binder were hardly discernible in this product and again the meat did not fall apart during serving.

EXAMPLE V

Because of its variable shape, liver is one of the most difficult pieces of meat to control in the preparation of a uniformly sized and shaped portion. Liver was cut into sections of approximately two inches in diameter, dusted with gluten, and pressed into a form. The product was then frozen and sliced while frozen into uniform slices of suitable weight. Upon cooking, the chunked liver was found to contain very strong, well knit seams which simulated the membranes of normal liver tissue. The quantity of gluten used was in the neighborhood of 1 to 2% of the weight of the liver.

EXAMPLE VI

Beef tenderloins are a costly product and actually only about two-thirds of the tenderloin is productive of steaks of suitable diameter. The tip end of the tenderloin is always small and invariably creates a disposal problem because of its high cost. To alleviate this problem a beef tenderloin was split horizontally and the tail of the loin folded back into the slit. Dry wheat gluten had previously been dusted on the small end of the tenderloin to produce the desired properties of adhesion. Subsequently tenderloin steaks were cut from the entire tenderloin, thereby producing steaks of a uniform dimension from end to end. The product was attractive and did not break apart at the seams during cutting of the steaks or upon broiling.

In addition to its adhesion on chunks of meat, gluten has particularly fine binding properties on all comminuted meats such as bologna, liver spreads, meat balls, etc. In preparing such a product, between about 0.2 and 5% gluten is added to the particular meat product. The particular quantity to be used is determined by the percentage of added moisture and fat used in the meat mixture.

EXAMPLE VII

This example illustrates tests made with "artificial pork chops" produced by pressing together 23 strips of meat in a form having a cross-sectional shape resembling that of a pork chop. The form holding these compressed pieces of meat was then placed in a freezer until the contents had hardened. The resulting block was sliced, while frozen, into one-half inch slices. One block of meat prepared according to the foregoing procedure contained no binding agent; five other blocks were prepared by adding 4 ounces of various binders per 6 pounds of pork shoulder meat chopped into one-half inch cubes and compressed and frozen as above described. The binders tested were: gluten, wheat starch, wheat flour (8–13% protein content), 33% gluten plus 67% flour, 67% gluten plus 33% flour.

The resulting "chops" produced from the above mixtures were cooked by two methods—ordinary pan frying and broiling. The following is a tabulation of the comparative results.

Table 1

| Sample | Condition after cooking |
| --- | --- |
| (1) Control (no binder) | Fell to pieces during cooking; not satisfactory. |
| (2) Wheat starch binder | Do. |
| (3) Wheat flour | Do. |
| (4) 33% gluten plus 67% flour | Rather poor adhesion; weak seams but remained an entity. |
| (5) 67% gluten plus 33% flour | Satisfactory but seams somewhat weak. |
| (6) Gluten | Very satisfactory; strong seams and chop not at all fragile. |

Thus, in preparing the "chops" of this example, about 31.76% of the binder should be wheat protein (calculating the flour at its minimum of 8% protein and the gluten at 80% protein) in order to produce a product which will not fall apart upon cooking and serving.

Obviously many modifications and variations of the invention as hereinbefore set forth may be made without departing from the spirit and scope thereof, and therefore only such limitations should be imposed as are indicated in the appended claims.

I claim:

1. A meat product formed of at least two portions of meat pieced together and bonded at the point of union with wheat gluten, said meat product remaining intact during further processing thereof, including cooking, and remaining intact when sliced while hot or cold.

2. A cooked meat product formed of at least two chunks of meat and having at least one seam therein simulating connective tissue of meat and composed of coagulated wheat gluten, said seam securing together said chunks, said product remaining intact when sliced while hot or cold.

3. In the method of preparing a meat product having at least one seam therein the improvement comprising adding wheat gluten to a portion of meat, joining said treated portion with another portion of said meat, and further processing said meat.

4. In the method of preparing a meat product having at least one seam therein the improvement comprising adding a small amount of wheat gluten to a portion of uncooked meat, joining said treated portion with another portion of said meat, conforming said meat to a particular shape, and further processing said meat.

5. In the method of preparing a meat product having at least one seam therein the improvement comprising adding at least about 0.2% wheat gluten by weight of said product to a portion of meat, joining said treated portion with another portion of said meat, and further processing said meat.

6. The method of preparing a meat product that will remain intact though prepared from at least two portions of meat which comprises joining the said portions of meat with a small amount of wheat gluten therebetween whereby to bind together said portions of meat, and cooking the so-joined portions of meat whereby said wheat gluten will coagulate and produce a seam simulating the connective tissue of meat, said seam being of such strength that said meat product will not fall apart when sliced while hot or cold.

7. A meat product formed of at least two portions of meat bonded together with a small amount of a binder, at least about 30% of which is wheat protein, said product remaining intact when sliced while hot or cold.

8. A formed meat product comprising a plurality of chunks of meat seamed together with wheat gluten, said plurality of chunks of meat remaining seamed together during further processing of said product, including cooking, said product remaining intact when sliced while hot.

9. A simulated meat chop comprising a plurality of chunks of meat pieced together and bonded at the points of union with wheat gluten and formed into a cross-sectional shape resembling a meat chop, said chop remaining intact during further processing thereof, including cooking, and remaining intact when sliced while hot.

References Cited in the file of this patent
UNITED STATES PATENTS

| | | |
|---|---|---|
| 619,338 | Painter | Feb. 14, 1899 |
| 869,371 | Kellogg | Oct. 29, 1907 |
| 1,381,526 | Waters | June 14, 1921 |
| 1,427,438 | Brickman | Aug. 29, 1922 |
| 2,808,335 | Pierce | Oct. 1, 1957 |

OTHER REFERENCES

"Manufacture of Frankfurters," May-June 1935, by C. R. Moulton, published by Meat Magazine, Chicago, page 5, article entitled Binders.